Fig. 3
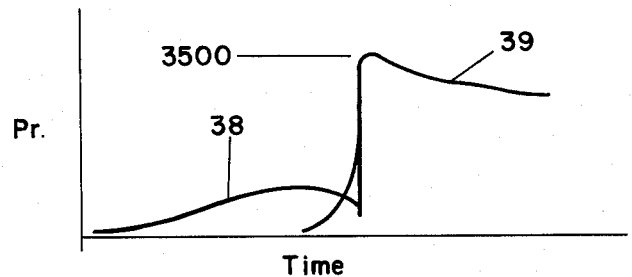
Fig. 4
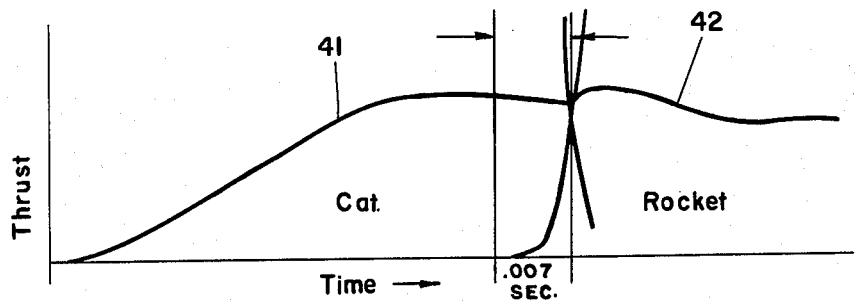
Fig. 6
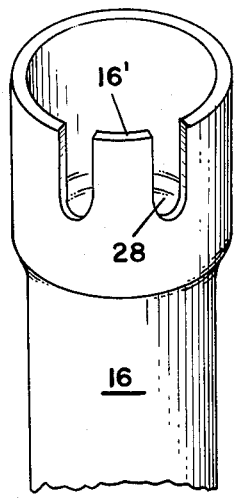
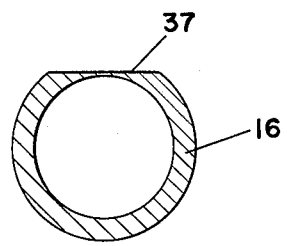
Fig. 5
INVENTORS.
NORMAN J. WAECKER
ALBERT BENDITT
BY
ATTORNEY 3,260,048
THRUSTER CATAPULT AND ROCKET MOTORS
Norman J. Waecker, Masonville, N.J., and Albert Benditt, Philadelphia, Pa., assignors to the United States of America as represented by the Secretary of the Army
Filed Feb. 24, 1964, Ser. No. 347,096
4 Claims. (Cl. 60—35.6)

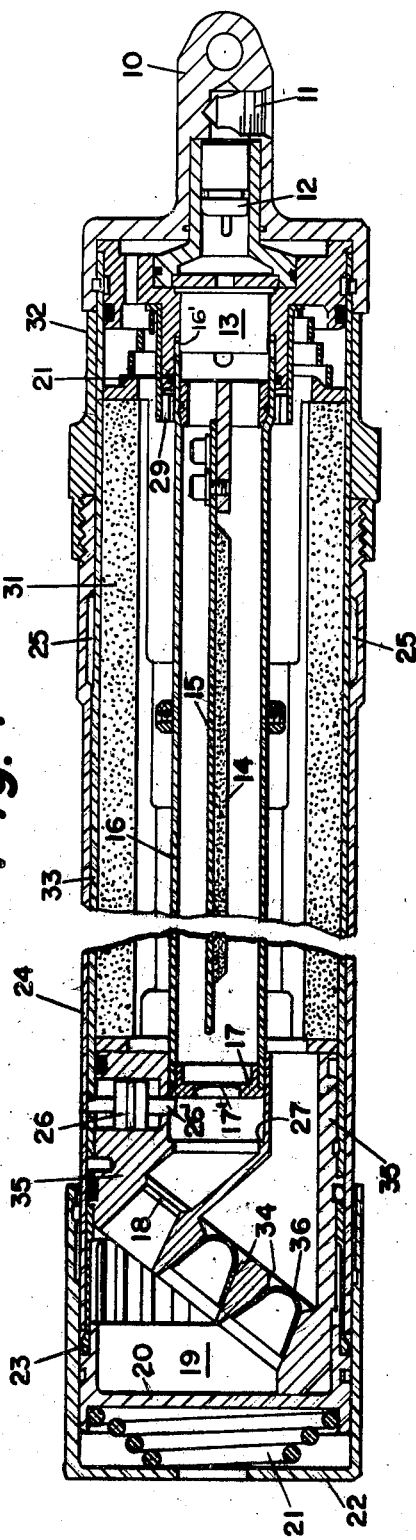
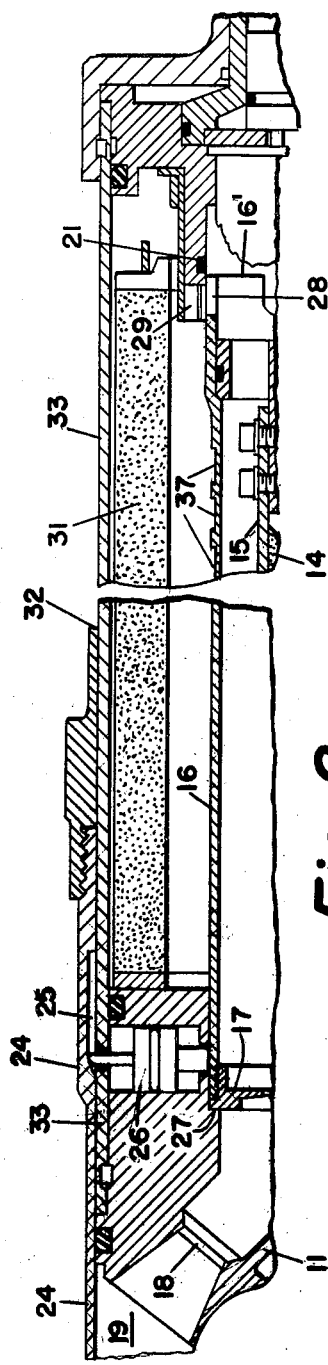

The invention described herein may be manufactured and used by or for the Government for governmental purposes without the payment to us of any royalty thereon.

This invention relates to a combination of a thruster catapult and a rocket motor such as is used for ejecting a seat and occupant from an aircraft. Heretofore there has been an objectionable impact and deceleration due to the kinetic energy of the seat being used to open a valve within the thruster catapult for passing igneous gas to fire the rocket propellant. This has caused not only an objectionable impact but also a noticeable deceleration that prevented the transition from the catapult motor to the rocket motor being as efficient and smooth as desired.

An object of this invention is to effect a smooth and efficient change from the thruster to the rocket motor that is free from the objections of noticeable impact and slowing of upward movement to the seat and occupant.

Referring to the drawings:

FIG. 1 is a longitudinal section showing the position of the several parts just before seat ejection;

FIG. 2 illustrates the relative positions at the time of firing the rocket;

FIG. 3 shows an approximate pressure-time graph for the catapult and rocket motors;

FIG. 4 is an approximate thrust time graph;

FIG. 5 depicts one of the flats that are milled on the catapult tube; and

FIG. 6 is an enlarged view of the large end of the catapult tube.

In the longitudinal sectional view of FIG. 1, the left or breech end of this motor is secured to the framework of an aircraft from which a seat and occupant might need to be ejected, such seat being connected to the right or head end fitting 10. A source of auxiliary pressure such as a propellant actuated device not shown, is connected to opening 11 to move firing pin 12 to the left for firing a primary igniter 13 which ignites a strip 14 of solid propellant adhesively secured to a metal supporting strip 15. The propellant 14 actuates the thruster catapult motor and is preferably formed as a double base propellant strip about 1/16 of an inch thick and having a width approximating the inside diameter of catapult tube 16 in which pressure is built up for the thruster catapult motor. The left end of tube 16 is partially closed by a thin erodeable plate 17, which functions to raise the pressure and temperature within tube 16 to insure complete and more rapid combustion of propellant 14. The small orifice 17' in the thin steel plate 17 has a diameter of about .09 of an inch and is enlarged by gas erosion to about .5 of an inch after the seat ejection has been concluded. The catapult gas issued through an opening 18 in the nozzle illustrated from which it passes into chamber 19 exerting pressure on the bottom wall 20 of the catapult bottom can. Initial movement of left end or bottom wall 20 compresses helical tapered convolutions of spring 21 between end wall 20 and lower wall 22 affixed to the aircraft frame for receiving the downward thrust during upward movement of the catapult motor. As end wall 20 is moved to the left far enough to be clear of the locking tangs 23, tangs 23 are bent radially inward enough to permit movement of the rocket motor tube 33 upward or to the right for ejecting a seat member affixed to the head end fitting 10.

When motor tube 33 reaches the position shown in FIG. 2, the groove 25 in launching tube 24 will be in the position shown where detent 26 under pressure of propellant gas will move radially outward so that the outer end of the detent 26 may be received in the groove 25. Such movement of detent 26 permits the tube 16 unrestricted travel to the left past the former inner restraining end 26' of the detent until it engages against abutment shoulder 27. The force available for this movement occurs because of the differential force upon end areas of tube 16, which differential force exists by reason of a larger diameter at the right end 16' of tube 16 (FIG. 6). The travel of tube 16 is sufficient for the longitudinal slots 28 in the right or opposite end of tube 16 to be moved from their initial position (FIG. 1) past gas sealing O-ring 21 to align with secondary igniter 29 (FIG. 2). This in turn fires the solid double base propellant 31 or main grain giving a higher pressure and more voluminous gas for operation of the rocket motor.

Between the time of the position of the catapult launching tube 24 shown in FIG. 2 and the time the rocket motor tube 33 has left the end 32 of launching tube 24 is an interval of about 7 (seven) milliseconds during which tube 33 travels a distance of about 3½ inches. As shown in FIGS. 3 and 4 the transition from catapult motor propulsion and the rocket motor propulsion is smooth and without any noticeable deceleration or impact shock. One cause of this smoothness is the absence of any demands on the kinetic energy of the moving seat that would produce impact shock and/or deceleration.

During operation of the catapult motor, a half dozen nozzle openings 34 in the nozzle fitting 35 of generally circular shape arranged to be at an angle as shown are inoperative and only one nozzle opening 18 is used for the catapult motor gas. During operation of the catapult motor, the nozzle openings 34 for the rocket motor gas are not in use and are closed by cap inserts 36 of light metal wedgingly secured in place and with a light adhesive because the only pressure on them at that time is that due to the pressure in chamber 19. However, on pressure build-up from the rocket propellant being ignited, the cap inserts 36 are all blown out (to the left in FIG. 1). This occurs approximately when rocket motor 33 is withdrawn from tube 24. Nozzle opening 18 is preferably also used by the rocket propellant gas along with the six other nozzle openings 34. For this purpose a number of flats 37 as shown in FIG. 5 have been cut or formed on tube 16 leaving a thickness of metal of about .015 inch in the longitudinal center of each flat, which is enough to withstand the catapult motor pressure within the tube of about 1200 pounds per square inch maximum but not enough to withstand the rocket pressure outside tube 16 of about 3500 to 4000 pounds per square inch maximum. This causes these flats to open inwardly widely enough for tube 16 to be of assistance in building up rocket thrust needed. Each flat 37 is about one inch in length and 3 or 4 are usually enough to obtain full use of tube 16 and opening 18 in nozzle 35 during operation of the rocket motor. So far as is possible it is desirable that each of the seven rocket motor nozzles 34, 18 have the same thrust. The rocket propellant 31 is of the same general double base type as that used for the catapult motor.

In FIG. 3 the catapult motor pressure reaches a maximum of 700 or 800 pounds per square inch in the chamber 19 shown in the ordinate while the abscissa is units of time. The portions where both the graph 38 for the catapult pressure and that for rocket pressure 39 are coexistant is during the short 7 millisecond interval previously mentioned when the flats 37 are ruptured by rocket propellant pressure, thereby raising the lower catapult pressure up to the rocket pressure at substantially the instant the rocket motor tube 33 leaves the right end 32 of the launching tube 24. FIG. 4 shows how the thrust upwardly applied to the seat fitting 10 is nearly equal to the thrust due to the same fitting by the rocket motor. In FIG. 3 the relatively lower thruster or catapult pressure 38 precedes the pressure 39 caused by firing of the rocket motor propellant. In FIG. 4 the thrust 42 due to the rocket motor is substantially a magnitudinal continuation of the thrust 41 due to the catapult. A smooth change in thrust during the transition from catapult motor to the rocket motor is effected because of the absence of any shock and deceleration. The movement of detent 26 into groove 25 occurs substantially simultaneously with initiation of rocket propellant pressure 39 and thrust 42 as shown in FIGS. 3 and 4. In FIG. 2 the time between the entry of detent 26 into its groove and the time when rocket motor 33 leaves the launch tube end 32 is about 7 milliseconds during which rocket tube 33 travels 3½ inches. The use of the numerous O-rings or other packing assist in preventing gas leakage where it is not desired. An outer end portion of detent 26 is sheared off when this detent reaches the upper end of groove 25 without incurring any perceptible deceleration in the rocket tube 33.

Various modifications and changes may be resorted to without departing from the scope of the invention as defined by the appended claims.

We claim:

1. In an ejection seat apparatus having a thruster type catapult motor and a rocket type motor operating in sequence, said motors each having a respective one of telescoping tube members, a launching tube telescopingly receiving said rocket motor tube, primary ignition means to generate pressure within said catapult tube for actuation thereof, secondary ignition means within said rocket tube and located exteriorly of said catapult tube for actuating said rocket motor, said catapult tube having one end larger than the other, said one end having means normally interrupting communication between the interior of said catapult tube and said secondary ignition means during catapult motor operation, means carried by said rocket tube for restraining said other end of said catapult tube, said restraining means being responsive to pressure build-up caused by catapult motor operation for releasing said other end, so constructed and arranged that the difference in forces acting upon said ends will move said catapult tube past the releasable restraining means and render said interrupting means ineffective.

2. The structure recited in claim 1 wherein said launching tube has an internal recess for receiving a portion of said restraining means.

3. The structure recited in claim 2 wherein said launching tube has one closed end and an open end receiving said rocket motor tube, and said internal recess is located adjacent said open end.

4. The structure recited in claim 1 wherein said restraining means is slidably mounted for movement radially outward of said catapult tube.

References Cited by the Examiner
UNITED STATES PATENTS

| | | | |
|---|---|---|---|
| 2,954,947 | 10/1960 | Zabelka et al. | 244—122 |
| 3,035,796 | 5/1962 | Glass | 244—122 |
| 3,063,240 | 11/1962 | Ledwith | 60—39.47 X |
| 3,125,851 | 3/1964 | Rubinstein et al. | 60—39.47 X |
| 3,169,003 | 2/1965 | Glass | 244—122 |

MARK NEWMAN, *Primary Examiner.*

CARLTON R. CROYLE, *Examiner.*